2,949,427

BREAKING OF OXO ALCOHOL EMULSIONS

John W. Andersen and Robert A. Heimsch, Dayton, Ohio, assignors to Monsanto Chemical Company, St. Louis, Mo., a corporation of Delaware No Drawing. Filed Oct. 17, 1957, Ser. No. 690,604

12 Claims. (Cl. 252—320)

The present invention relates to a process for breaking or resolving emulsions of Oxo alcohols with water, particularly during the purification of the said alcohols.

An object of this invention is the provision of a process for the purification of Oxo alcohols by the use of aqueous solutions of alkaline treating agents which are particularly susceptible to the formation of emulsions. A further object is the provision of a process for resolving and preventing emulsions in which Oxo alcohols constitute one of the phases of the emulsions.

The Oxo process utilizes olefins which are reacted with carbon monoxide and hydrogen in the presence of a catalyst at elevated temperatures and pressures to produce aldehydes as the primary products. The aldehydes are then hydrogenated to alcohols which have utility in a number of industrial applications such as in the preparation of esters which serve as plasticizers. It has been found that the alcohols thus obtained contain a number of impurities resulting from side reactions occurring in the Oxo process. Such impurities include various saturated and unsaturated aldehydes, aldols, acetals, acids, and other compounds. In order to remove certain of the said impurities, it is conventional to treat the crude alcohol mixture with an alkaline material such as sodium hydroxide, sodium carbonate, potassium hydroxide, potassium carbonate, or ammonia. The alkaline agent, generally employed in aqueous solution, is vigorously agitated with the crude Oxo alcohol after which the entire mixture is allowed to stand in order to separate the organic layer from the aqueous layer which includes the various types of soaps that are present. Because of the high concentration of inorganic compounds present at this time, i.e., in the use of a 10 to 50% alkaline solution, the phase separation is usually possible at this point.

However, in the additional water washing which is necessary in order to remove the alkaline compounds, it has been found that such dilution with water results in the formation of stable emulsions. Such emulsions therefore trap large amounts of the desired alcohols in either the continuous or discontinuous phase of the emulsion. The emulsions possess unusual stability and, hence, require prolonged standing or other expensive treatments for their resolution in order to recover the Oxo alcohols in a purified form. It has been found that the conventional means of separating emulsions such as acid treatment with a mineral acid are impractical in the present instance because of contamination difficulties. Centrifuging and filtration are ineffective in breaking the said emulsions.

It has now been found that the formation of emulsions may be prevented by treating the Oxo alcohol having small amounts of residual, aqueous alkaline solution admixed therein as described above with carbon dioxide. In this embodiment of the invention, gaseous carbon dioxide is blown through the said mixture before the water washing step. As a result of this improvement, it is found that the subsequent water washing does not form emulsions, but that the alcohol separates cleanly from the wash water. It has also been found that emulsions of Oxo alcohols which have formed with alkaline aqueous solutions may be broken by treating the said aqueous emulsions with gaseous carbon dioxide.

Small proportions of carbon dioxide have been found to be surprisingly effective in this relationship, although it is preferred that the addition of carbon dioxide to the alcohol or to the emulsion of the crude Oxo alcohol be continued until a pH of about 8 is reached. The purified and separated alcohol is then recovered by a phase separation step such as decantation to draw off and separate the aqueous alkaline layer from the organic layer.

The concentration of the alkaline treating agent is not critical in the present invention which may be applied to the conventional alkaline solutions such as those having from 10% to 50% by weight of the alkaline compounds described above in an aqueous solution. The temperature at which the present resolution process is conducted may be varied over a broad range, although it has been found that particularly effective results are obtained at temperatures between 40° C. and 100° C. It has been found that the use of heat alone is insufficient to break the present emulsions since overnight heating at a temperature of 60° C. was substantially ineffectual in breaking such an emulsion of crude isodecyl alcohol in wash water, following contact with 15 volume percent of a sodium hydroxide solution (50 weight percent NaOH).

The present process may be carried out in a continuous fashion utilizing a number of holding vessels for the separation of the organic and aqueous phases. However, the method may also be applied as a batch process in which the entire operation takes place within a single vessel. In this procedure, the crude alcohol is first mixed with the aqueous solution of the alkaline-treating agent in a treating vessel. This mixture is then heated and agitated after which the strong alkaline solution is withdrawn. The alcohol is then treated with gaseous carbon dioxide until a pH reading of 8 is obtained from a sample of water which had been shaken with the alcohol. Further water washing is then utilized to free the alcohol of soaps and residues which are formed by the reaction of the alkali with the various impurities such as aldehydes, aldols, acetals, acids and other compounds. Such washing operations may be repeated with separation of the aqueous layer after each contacting with the added proportions of water. It is at this stage of the washing operation that emulsions are most likely to be formed without the use of the present carbon dioxide treatment.

The present emulsion breaking process may also be applied to undesired emulsions of Oxo alcohols and alkaline solutions. For this purpose, gaseous carbon dioxide is applied directly to the emulsion by means of a pipe leading into the treating vessel or alternatively, such as in small-scale operations, by the addition of solid carbon dioxide. A stream of carbon dioxide gas is obtained and passed through the heterogeneous mixture of three layers, i.e., the alcohol, the emulsion layer and the lower layer of water. The addition of carbon dioxide is preferably continued until the aqueous layer exhibits a pH of about 8. It is found that as a result of such treatment, the emulsion readily breaks or separates so that the alcohol may be obtained as an upper layer while the aqueous layer is drawn off at the lower part of the treating vessel.

The present process may be carried out directly on emulsions of crude alcohols obtained by the hydrogenation of the primary aldehydes from oxonation, although it is often expedient to subject the alcohol to a preliminary distillation treatment. Thus, the crude alcohol mixture may first be flash distilled in order to remove catalysts, residues, as well as other heavy components as a residual fraction while unreacted hydrocarbons are obtained as a forecut in the distillation.

The refined alcohol thus obtained by the present alkaline treatment in which the alkali is completely removed by washing and emulsion separation with gaseous carbon dioxide may be utilized in the preparation of esters. For example, the purified isodecyl alcohol may be reacted with phthalic anhydride to give colorless esters which are of great utility in plasticizing polyvinyl chloride. In contrast thereto, the use of untreated alcohols has been found to yield highly colored phthalate esters which discolor polyvinyl chloride when the ester is employed as a plasticizer therein.

The following examples illustrate specific embodiments of the present invention.

Example 1

The Oxo alcohol employed in the present refining process was obtained by the oxonation of propylene trimer with carbon monoxide and hydrogen to obtain a crude mixture of $C_{10}$ aldehydes which were then hydrogenated to give an impure product consisting predominantly of isodecyl alcohol. The mixture also contained unreacted hydrocarbons, isodecyl formate, isodecyl aldehydes, and isodecanoic acid, as well as minor proportions of various acetals, aldols, ethers, ketones, unsaturated aldehydes and other impurities. The crude alcohol mixture was preliminarily distilled to remove hydrocarbons and heavy residual products, thus yielding a broad alcohol cut containing minor proportions of saturated and unsaturated aldehydes, formates, other esters and acids. This alcohol cut from the distillation was treated by shaking with 15 volume percent of a 50% aqueous solution of sodium hydroxide. It was found that the caustic treatment served to reduce some of the impurities in the alcohol fraction. The caustic treated alcohol was then subjected to a number of treatments in order to ascertain their effectiveness in preventing and breaking emulsions of the alcohol with water. These treatments and the results obtained are summarized below:

| Method of Treatment | Results Obtained |
| --- | --- |
| Washed and heated to 95° C. | Less than 50% separation of alcohol from the emulsion. |
| Centrifuging the emulsion phase only at 2,000 r.p.m. for 10 minutes. | About 75% separation. |
| Treatment of alcohol only with carbon dioxide to 8.0 pH. | Later water washing did not form any emulsion. |
| Treatment of alcohol-water emulsion with carbon dioxide to 8.0 pH. | Emulsion broke in 5 minutes. |
| Addition of ether to alcohol-water emulsion. | No separation (less than 5%). |
| Addition of sodium chloride to alcohol-water emulsion. | Do. |
| Addition of benzene and salt at 80° C. to alcohol-water emulsion. | Do. |

Example 2

In another experiment, crude butyl alcohol obtained by the oxonation of propylene, followed by hydrogenation of the aldehydes was subjected to the carbon dioxide treating step of Example 1, and showed a similar tendency against the formation of aqueous emulsions.

Example 3

This example illustrates the applicability of the present method when applied to octyl alcohols. The direct oxonation of propylene was found to give a mixture of normal and isobutyl aldehydes. Separation of these components, and aldolization, followed by hydrogenation then gives a crude 2-ethylhexanol containing 2-ethylhexaldehyde and 2-ethylhexenal as the principal impurity. The crude alcohol, after having been treated with aqueous sodium hydroxide, was found to be highly susceptible to the formation of emulsions of water. However, when the said caustic treatment was followed with a carbon dioxide treatment as in Example 1, either by the use of direct carbon dioxide blowing of the alcohol, and also by the carbon dioxide blowing of previously-formed aqueous emulsions, it was found that the emulsification tendency was greatly reduced.

What is claimed is:

1. Process for the resolution of emulsions of impure Oxo alcohols with aqueous alkaline solutions which comprises contacting the said emulsion with gaseous carbon dioxide.

2. Process for the resolution of emulsions of impure Oxo alcohols with aqueous alkaline solutions which comprises contacting the said emulsions with gaseous carbon dioxide until the aqueous phase of the said emulsion reaches a pH of about 8.

3. Process for treatment of impure Oxo alcohols in order to reduce the emulsification tendency thereof with water which comprises first contacting the said alcohols with an alkaline material whereby the said alcohol exhibits an alkaline reaction, and thereafter contacting the said alcohols with carbon dioxide until the pH of the said alcohol is about 8.

4. Process for the resolution of emulsions of impure decyl alcohols containing emulsion-forming organic components with aqueous alkaline solutions which comprises contacting the said emulsion with gaseous carbon dioxide.

5. Process for the resolution of emulsions of impure decyl alcohols containing emulsion-forming organic components with aqueous alkaline solutions which comprises contacting the said emulsions with gaseous carbon dioxide until the aqueous phase of the said emulsion reaches a pH of about 8.

6. Process for treatment of impure decyl alcohols containing emulsion-forming organic components in order to reduce the emulsification tendency thereof with water which comprises first contacting the said alcohols with an alkaline material whereby the said alcohol exhibits an alkaline reaction, and thereafter contacting the said alcohols with carbon dioxide until the pH of the said alcohol is about 8.

7. Process for the resolution of emulsions of impure butyl alcohols containing emulsion-forming organic components with aqueous alkaline solutions which comprises contacting the said emulsion with gaseous carbon dioxide.

8. Process for the resolution of emulsions of impure butyl alcohols containing emulsion-forming organic components with aqueous alkaline solutions which comprises contacting the said emulsions with gaseous carbon dioxide until the aqueous phase of the said emulsion reaches a pH of about 8.

9. Process for treatment of impure butyl alcohols containing emulsion-forming organic components in order to reduce the emulsification tendency thereof with water which comprises first contacting the said alcohols with an alkaline material whereby the said alcohol exhibits an alkaline reaction, and thereafter contacting the said alcohols with carbon dioxide until the pH of the said alcohol is about 8.

10. Process for the resolution of emulsions of impure octyl alcohols containing emulsion-forming organic components with aqueous alkaline solutions which comprises contacting the said emulsion wtih gaseous carbon dioxide.

11. Process for the resolution of emulsions of impure octyl alcohols containing emulsion-forming organic components with aqueous alkaline solutions which comprises contacting the said emulsions with gaseous carbon dioxide until the aqueous phase of the said emulsion reaches a pH of about 8.

12. Process for treatment of impure octyl alcohols containing emulsion-forming organic components in order to reduce the emulsification tendency thereof with water which comprises first contacting the said alcohols with an alkaline material whereby the said alcohol exhibits an alkaline reaction, and thereafter contacting the said alcohols with carbon dioxide until the pH of the said alcohols is about 8.

References Cited in the file of this patent

UNITED STATES PATENTS

| | | |
|---|---|---|
| 2,135,081 | Kaplan | Nov. 1, 1938 |
| 2,589,198 | Monson | Mar. 11, 1952 |
| 2,595,785 | Hale | May 6, 1952 |
| 2,595,786 | Hale et al. | May 6, 1952 |
| 2,626,284 | Smith | Jan. 20, 1953 |